United States Patent Office 3,839,350
Patented Oct. 1, 1974

3,839,350
PRODUCTION OF VINYL OXAZOLINE ESTERS
Jerry Hoyt Hunsucker, Terre Haute, Ind., assignor to Commercial Solvents Corporation, Terre Haute, Ind.
No Drawing. Continuation of abandoned application Ser. No. 46,476, June 15, 1970. This application Apr. 14, 1972, Ser. No. 244,315
Int. Cl. C07d 85/36
U.S. Cl. 260—307 F      1 Claim

ABSTRACT OF THE DISCLOSURE

An improved process for the production of a vinyl oxazoline or a vinyl oxazoline ester by condensation of an oxazoline or an oxazoline ester with a solution of formaldehyde in a lower alkanol at a temperature of 185–190° C. and maintaining the temperature at 185–190° C. for a period of time sufficient to effect dehydration of the condensation product.

This is a continuation, of application Ser. No. 46,476, filed June 15, 1970, now abandoned.

BACKGROUND OF THE INVENTION

This invention relates to the production of oxazoline derivatives. In a particular aspect, it relates to the production of vinyl oxazolines and vinyl oxazoline esters by the condensation of formaldehyde with an oxazoline or oxazoline ester.

It is known in the art to prepare vinyl oxazolines and vinyl oxazoline esters by condensing an oxazoline corresponding to formula I:

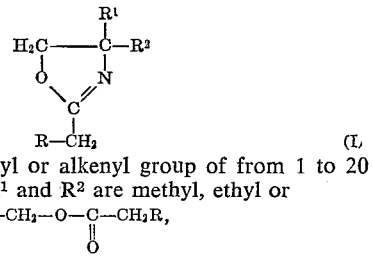

wherein R is an alkyl or alkenyl group of from 1 to 20 carbon atoms and $R^1$ and $R^2$ are methyl, ethyl or

—CH$_2$—O—C—CH$_2$R,
               ‖
               O and can be the same or different, with formaldehyde in about a 1:2 mole ratio and at a temperature of 100–125° C. in the presence of an inert atmosphere, such as by sparging nitrogen through the reaction mixture. Previously, paraformaldehyde has been used as the formaldehyde source, and the temperature was held in the foregoing range until the paraformaldehyde had dissolved, thereby forming a bis-hydroxymethyl addition compound. The temperature was then raised to 200° C. or more to effect dehydration and formation of the vinyl compound. Also it is known that the best yields are obtained when the reaction mixture is heated rapidly, e.g. at 1–2°/min., to 185° C. then held at that temperature for dehydration to be completed.

Products of this type, especially those from unsaturated fatty acids, are useful as synthetic vehicles for the formulation of both baking type and air-drying paints, varnishes and other coatings.

This process has been very successful on a small scale, but the rapid rise in temperature proved difficult to achieve when large volumes of materials were used. Consequently conversion to the vinyl oxazoline was comparatively low. By-products and incomplete conversions lead to variations in the performance of the dried coatings in which the vinyl oxazolines are used as the vehicle. Separation of the objectionable fractions is difficult to achieve because, like the principal product, they are high-boiling and their boiling points lie close together.

By-products include a divinyl compound having a vinyl group on the α-carbon of the 4-acyloxy group, if any, Compounds of this type are objectionable in coating vehicles because they tend to form cross-linking polymers which are hard and poorly soluble in the usual solvents.

Other objectionable components include 2-(1-ethenyl alkyl or alkenyl)-4-alkyl or hydroxymethyl - 4 - hydroxymethyl oxazolines resulting from hydrolysis of the ester, unreacted ester oxazoline starting compound, unconverted condensation products, and color bodies. It is desirable to minimize such components both individually and collectively to obtain the full advantages of the synthetic vehicles.

SUMMARY OF THE INVENTION

It is an object of this invention to provide an improved process for the production of oxazoline derivatives.

It is another object of this invention to provide an improved process for the production of 2-(1-ethenyl alkyl or alkenyl) oxazolines or oxazoline esters of relatively high ethenyl (vinyl) content.

A third object of this invention is a method for the production of compositions having a low proportion of unreacted oxazoline or oxazoline ester, unconverted formaldehyde condensation product, vinyl oxazoline alcohol resulting from hydrolysis of the vinyl oxazoline ester, and divinyl compounds.

It is the discovery of this invention that vinyl oxazolines and vinyl oxazoline esters corresponding to the following formula II, can be produced in much higher purity than by the prior processes:

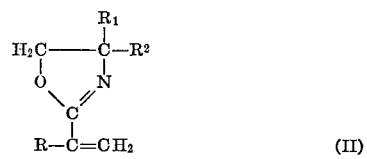

where R, $R^1$ and $R^2$ have the same meanings described above.

The improved process of this invention comprises heating an oxazoline or oxazoline ester to 185–190° C., then adding formaldehyde dissolved in a suitable solvent incrementally and at a rate as rapidly as possible without significantly cooling the reaction mixture. Heating is maintained at 185–190° C. for about 15 min.–1 hour to effect dehydration and the formaldehyde solvent and water of reaction which is formed are separated by distillation.

DETAILED DISCUSSION

In carrying out the process of this invention, an oxazoline corresponding to formula I set forth above is charged to a reaction vessel equipped with an agitation means, a temperature sensing device and a decanter head with a reflux condenser. A polymerization inhibitor, about 0.01% to 0.1% by weight, is added when desired, and is preferred when R in the foregoing formula contains less than 10 carbon atoms. The mixture is then heated with agitation to 185°–190° C.

When the pot temperature has reached 185° C., the formaldehyde solution is added incrementally but as rapidly as possible without causing the temperature to fall below 185° C. After formaldehyde addition is complete, heating is continued at 185–190° until elimination of water of reaction is complete, e.g. for about 15–45 min.

When water of reaction is no longer being eliminated, the crude product, the vinyl oxazoline, is allowed to cool. It is generally suitable for use as is or the lower molecular weight products can be vacuum distilled to obtain a purified material.

The oxazoline starting materials represented by formula I as used in the practice of this invention are commercially available or can be prepared by any suitable process, many of which are known. The commercially available materials are generally satisfactory. Preferably, they are of good quality.

The formaldehyde used in the practice of this invention is supplied as a non-aqueous, but not necessarily anhydrous, solution. A suitable solvent is one which is miscible but not reactable with oxazoline. Gaseous formaldehyde can also be used when convenient. Preferably the formaldehyde is supplied as a solution in an alkanol of from 1-4 carbon atoms, e.g. in methanol, ethanol, 2-propanol or butanol. These solutions are commercially available and the usual commercial products are suitable. The formaldehyde is used in a mole ratio of from about 1-8 per mole of oxazoline.

As set forth above, when R contains less than 10 carbon atoms, from about 0.01% to about 1% of a polymerization inhibitor is employed in the dehydration step. Suitable inhibitors include di-beta-naphthol, hydroquinone, p-hydroxydiphenylamine, N,N'-diphenylphenylenediamine, 2, 5-di-tert.-butylhydroquinone, trinitrotoluene, copper carbonate, methylene blue and butylated hydroxytoluene.

The invention will be better understood with reference to the following examples. They are intended only to further illustrate the invention and it is not intended that the invention be limited thereby.

Example 1

An oxazoline diester, 1 mole, prepared from tall oil fatty acids and tris(hydroxymethyl)aminomethane was charged to a reaction vessel equipped with an agitation means, and a distillation column with a take-off head and was heated under an atmosphere of nitrogen to 185° C. Formaldehyde, 2 moles, dissolved in methanol (55% by wt. solution) was added gradually to the heated oxazoline, but as rapidly as possible without cooling the reaction mixture below 185°. About 1 hour was required. The heating was continued for about 45 min. during which time methanol, formaldehyde and water of reaction were collected in the take-off head.

The product was cooled under the inert atmosphere to room temperature. It had a color of 9, Gardner, and a viscosity of E, Gardner. The vinyl diester content as determined from the infrared absorption spectrum was 2.28 times as great as the vinyl content of an oxazoline prepared by the prior process using paraformaldehyde in place of the methanolic solution.

Example 2

The experiment of Example 1 was repeated in all essential details except that the oxazoline employed was the mono-ester prepared from 2-amino-2-ethyl-1,3-propanediol and pelargonic acid. The resulting product had a very high vinyl oxazoline ester content compared with that obtained by the prior process. The viscosity was D+ and the color 17.

Example 3

The experiment of Example 1 was repeated in all essential details for 7 runs, except that the reaction temperature was held at 190° C. and in runs 2 and 3 the formaldehyde was supplied in isobutyl alcohol and n-butanol, respectively, instead of methanol. Also the mole ratio of formaldehyde to axazoline was varied. The "vinyl content" in the table below is expressed as the ratio of the vinyl content of the product obtained by the new process to the statistically standard vinyl content of the product obtained by the prior process. The data are summarized in the following table:

|  | 1 | 2 | 3 | 4 | 5 | 6 | 7 |
|---|---|---|---|---|---|---|---|
| Moles HCHO to ester | 2 | 2 | 2 | 4 | 4 | 8 | 8 |
| Color | 10 | 9 | 8 | 14 | 13 | 12 | 10 |
| Viscosity | G–H | D | D | G | F–G | G–H | I |
| Heating time, min.[1] | 45 | 45 | 45 | 45 | 45 | [2] | 15 |
| Vinyl content | 2.10 | 2.75 | 2.34 | 2.09 | 1.87 | 2.34 | 2.54 |

[1] After formaldehyde addition is complete.
[2] None.

Example 4

The experiment of Example 1 is repeated except that 2-ethyl-4-methyl-4-propionyloxymethyl-2-oxazoline, 4 moles, is employed as the oxazoline. A high yield of 2-isopropenyl-4-methyl-4-propionyloxymethyl-2-oxazoline is obtained.

Example 5

The experiment of Example 1 is repeated except that 2-ethyl-4,4-bis(propionyloxymethyl)-2-oxazoline, 4 moles, is employed as the oxazoline. A high yield of 2-isopropenyl-4,4-bis(propionyloxymethyl)-2-oxazoline is obtained.

Example 6

The experiment of Example 1 is repeated except that 2-heptadecyl-4-methyl-4-octadecanoyloxymethyl-2-oxazoline, 4 moles is employed as oxazoline. A high yield of 2-(1-ethenylheptadecyl)-4-methyl-4-octadecanoyloxymethyl-2-oxazoline is obtained.

Example 7

The experiment of Example 1 is repeated in all essential details except that 2-heptadecenyl-4,4-dimethyl-2-oxazoline, 4 moles, is employed as the oxazoline. A high yield of 2-(1-ethenylheptadecenyl)-4,4-dimethyl-2-oxazoline is obtained.

What is claimed is:

1. In a process for the production of a vinyl oxazoline corresponding to the formula

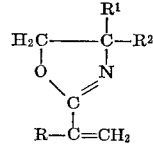

wherein R is an alkyl or alkenyl group of from 1 to 20 carbon atoms and $R^1$ and $R^2$ are methyl, ethyl or the group

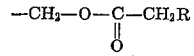

and can be the same or different, by reacting an oxazoline corresponding to thhe formula

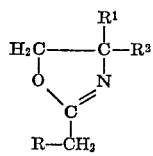

with an alkanol solution of formaldehyde in a mole ratio of from 1-8 of said formaldehyde to 1 of said oxazoline, at an elevated temperature for a period of time sufficient to effect production of said vinyl oxazoline, and thereby forming water of reaction, and separating said water by distillation, the improvement comprising the step of rapidly adding said formaldehyde solution to said oxazoline at a temperature of 185–190° C. while maintaining the temperature at not less than 185° C.

References Cited

UNITED STATES PATENTS

| 3,248,397 | 4/1966 | Purcell | 260—307 |
| 3,535,332 | 10/1970 | Runge et al. | 260—307 |
| 3,652,513 | 3/1972 | Gagliardi | 260—80.3 |

RAYMOND V. RUSH, Primary Examiner